United States Patent
Nishikawa et al.

(10) Patent No.: US 11,491,760 B2
(45) Date of Patent: Nov. 8, 2022

(54) BREATHABLE SHEET, LAMINATE, AND COMPOSITE

(71) Applicant: MITSUI CHEMICALS, INC., Tokyo (JP)

(72) Inventors: Shigeo Nishikawa, Chiba (JP); Katsuyuki Kajihara, Saitama (JP); Satoshi Noma, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/979,673

(22) PCT Filed: Mar. 7, 2019

(86) PCT No.: PCT/JP2019/009160
§ 371 (c)(1),
(2) Date: Sep. 10, 2020

(87) PCT Pub. No.: WO2019/176743
PCT Pub. Date: Sep. 19, 2019

(65) Prior Publication Data
US 2021/0046731 A1    Feb. 18, 2021

(30) Foreign Application Priority Data
Mar. 13, 2018  (JP) .............................. JP2018-045280

(51) Int. Cl.
*B32B 5/26*       (2006.01)
*B32B 27/08*      (2006.01)
*B32B 27/32*      (2006.01)

(52) U.S. Cl.
CPC ................ *B32B 5/26* (2013.01); *B32B 27/08* (2013.01); *B32B 27/32* (2013.01); *B32B 2307/724* (2013.01)

(58) Field of Classification Search
CPC ..... C03C 21/002; C03C 3/085; C03C 4/0092; C03C 4/16; C03C 2204/00; G06F 3/044
See application file for complete search history.

(56) References Cited

U.S. PATENT DOCUMENTS 8,785,032 B2 * 7/2014 Yamada .............. H01M 50/403
                                                                428/220
9,725,540 B2   8/2017 Uekusa et al.
(Continued)

FOREIGN PATENT DOCUMENTS

JP    2007211378 A    8/2007
JP    2008179757 A    8/2008
(Continued)

OTHER PUBLICATIONS

JP-2012092302—A Machine Translation (provided by Applicant) (Year: 2012).*
(Continued)

*Primary Examiner* — Travis M Figg
(74) *Attorney, Agent, or Firm* — Buchanan, Ingersoll & Rooney PC (57) ABSTRACT

The breathable sheet of the present invention is comprised of a 4-methyl-1-pentene-based polymer or a resin composition containing the 4-methyl-1-pentene-based polymer as a main component. In addition, the breathable sheet of the present invention is preferably selected from the group consisting of a net, a mesh, a non-woven fabric, a woven fabric, and a perforated sheet.

12 Claims, 2 Drawing Sheets

(56) References Cited

U.S. PATENT DOCUMENTS

| | | | |
|---|---|---|---|
| 10,662,270 B2 | 5/2020 | Uekusa et al. | |
| 2012/0220728 A1* | 8/2012 | Uekusa | C08L 23/20 525/240 |
| 2013/0288132 A1* | 10/2013 | Terakawa | H01M 50/417 429/249 |
| 2014/0234538 A1* | 8/2014 | Yamada | B29C 48/00 427/126.3 |
| 2017/0005321 A1* | 1/2017 | Sugata | H01M 50/411 |
| 2017/0298160 A1 | 10/2017 | Uekusa et al. | |
| 2018/0097256 A1* | 4/2018 | Modeki | H01M 50/403 |
| 2019/0382572 A1 | 12/2019 | Matayoshi et al. | |

FOREIGN PATENT DOCUMENTS

| | | | |
|---|---|---|---|
| JP | 2012092302 A | * | 5/2012 |
| JP | 2012092302 A | | 5/2012 |
| JP | 2015007179 A | | 1/2015 |
| WO | 2011055803 A1 | | 5/2011 |
| WO | 2018/143411 A1 | | 8/2018 |

OTHER PUBLICATIONS

International Search Report (PCT/ISA/210) and an English translation thereof, and Written Opinion (PCT/ISA/237) dated May 7, 2019, by the Japanese Patent Office as the International Searching Authority for International Application No. PCT/JP2019/009160.

Mitsui Chemicals: "TPX (TM) Polymethyl Pentene (PMP)," Dec. 25, 2015, XP055847710, retrieved from https://www.mitsui.com/de/en/business/plastics/_icsFiles/afieldfiled/2015/12/25/100408_PXT.pdf (6 pages) (Cited on Extended European Search Report dated Oct. 15, 2021, in corresponding EP Patent Application No. 19767759.4).

* cited by examiner

BREATHABLE SHEET, LAMINATE, AND COMPOSITE

TECHNICAL FIELD

The present invention relates to a breathable sheet, a stacked product, and a composite.

BACKGROUND ART

Since a breathable sheet has excellent permeability of gas such as water vapor, the breathable sheet is used for various usages such as sanitary materials, clothing materials, medical materials, fresh food packaging materials, agricultural materials, various filters, battery separators, and construction materials.

As a technique relating to such a breathable sheet, for example, a technique described in Patent Document 1 (Japanese Unexamined Patent Application No. 2008-179757) is exemplified.

Patent Document 1 discloses a breathable film comprised of a polyethylene resin composition containing 30 to 200 parts by weight of inorganic filler (D) and 0.5 to 10 parts by weight of aliphatic alcohol fatty acid ester (E), with respect to 100 parts by weight of a resin component comprised of 60% to 90% by weight of ethylene.α-olefin copolymer (A) having a density of 0.900 to 0.940 g/cm$^3$, MFR of 0.5 to 5.0 g/10 minutes, and a ratio (QA) of a weight average molecular weight and a number average molecular weight of 3 to 8, 2 to 25% by weight of linear low-density polyethylene (B) having a density of 0.871 to 0.910 g/cm$^3$, MFR of 0.5 to 10 g/10 minutes, and a ratio (QB) of a weight average molecular weight and a number average molecular weight of 1 or more and less than 3, and 2% to 20% by weight of a branched low-density polyethylene (C) having a ratio of a weight average molecular weight and a number average molecular weight of 3 to 15.

RELATED DOCUMENTS

Patent Documents

[Patent Document 1] Japanese Unexamined Patent Application No. 2008-179757

SUMMARY OF THE INVENTION

Technical Problem

According to the study of the present inventors, it was apparent that a breathable sheet in the related art was excellent in air-permeability, but there was room for improvement in flexibility, shape memory properties, shape following properties, and stress relaxation properties.

The present invention has been made in view of the circumstances, and provides a breathable sheet which is excellent in performance balance between flexibility, shape memory properties, shape following properties, and stress relaxation properties.

Solution to Problem

The present inventors intensively studied to realize a breathable sheet excellent in performance balance between flexibility, shape memory properties, shape following properties, and stress relaxation properties. As a result, it was found that a breathable sheet comprised of a 4-methyl-1-pentene-based polymer or a resin composition containing the 4-methyl-1-pentene-based polymer as a main component is excellent in performance balance between air-permeability, flexibility, shape memory properties, shape following properties, and stress relaxation properties, thereby completing the present invention.

That is, according to the present invention, the following breathable sheet and composite are provided.

[1] A breathable sheet comprised of a 4-methyl-1-pentene-based polymer or a resin composition containing the 4-methyl-1-pentene-based polymer as a main component.

[2] The breathable sheet according to [1], in which the breathable sheet is selected from the group consisting of a net, a mesh, a non-woven fabric, a woven fabric, and a perforated sheet.

[3] The breathable sheet according to [1] or [2], in which the breathable sheet has an air-permeability of 1 cc/cm$^2$/sec or more, which is measured under conditions of 24° C. and 50% RH, in accordance with JIS K6400-7: 2012 (method B).

[4] The breathable sheet according to any one of [1] to [3], in which the 4-methyl-1-pentene-based polymer contains a constitutional unit derived from 4-methyl-1-pentene and a constitutional unit derived from an α-olefin other than 4-methyl-1-pentene and having 2 to 20 carbon atoms.

[5] The breathable sheet according to any one of [1] to [4], in which at least one or more temperatures at which a maximum value of a loss tangent (tan δ) is exhibited, which is obtained by a dynamic viscoelasticity measurement, are present in a range of 10° C. or more and 100° C. or less, and the maximum value of the loss tangent is 0.5 or more and 3.5 or less.

[6] The breathable sheet according to any one of [1] to [5], in which the breathable sheet has a thickness in a range of 0.01 mm or more and 10 mm or less.

[7] The breathable sheet according to any one of [1] to [6], in which the breathable sheet is used for a member that may be directly or indirectly in contact with a human body surface when used.

[8] The breathable sheet according to any one of [1] to [7], in which the breathable sheet is a non-foam product.

[9] A stacked product formed by stacked two or more layers of the breathable sheet according to any one of [1] to [8].

[10] A composite including: the breathable sheet according to any one of [1] to [8] or the stacked product according to [9]; and a member that is different from the breathable sheet and is provided on at least one surface of the breathable sheet.

[11] The composite according to [10], in which the member that is different from the breathable sheet contains one kind or two or more kinds selected from the group consisting of a woven fabric, a non-woven fabric, a synthetic fiber, an artificial leather, a synthetic leather, a natural leather, a fur, a metal, a carbon material, a rubber, a thermoplastic elastomer, a thermoplastic resin, a thermosetting resin, a polymer foam, a mesh structure, a fiber-reinforced plastic, a paper, an wood, a glass, a stone, and a ceramic.

[12] The composite according to [10] or [11], in which the member that is different from the breathable sheet has an air-permeability of 1 cc/cm$^2$/sec or more, which is measured under the conditions of 24° C. and 50% RH, in accordance with JIS K6400-7: 2012 (method B).

Advantageous Effects of Invention

According to the present invention, it is possible to provide a breathable sheet excellent in performance balance between flexibility, shape memory properties, shape following properties, and stress relaxation properties.

BRIEF DESCRIPTION OF THE DRAWINGS

The above-described object, other objects, features, and advantages become more apparent from the preferred embodiments described below and the accompanying drawings described below.

DESCRIPTION OF EMBODIMENTS

Hereinafter, embodiments of the present invention will be described with reference to the drawings. In all the drawings, like components are denoted by common reference numerals, and description thereof will not be repeated. "A to B" indicating a numerical value range represents A or more and B or less unless otherwise specified.

In addition, a breathable sheet (A) according to the present embodiment includes not only a sheet shape but also a film shape.

1. Breathable Sheet

The breathable sheet (A) according to the present embodiment is comprised of a 4-methyl-1-pentene-based polymer (a1) or a resin composition (P) containing a 4-methyl-1-pentene-based polymer (a1) as a main component. Here, the main component is defined as a resin component having the largest content among the resin components contained in the resin composition (P).

As described above, according to the study of the present inventors, it was apparent that the breathable sheet in the related art is excellent in air-permeability, but there is room for improvement in flexibility, shape memory properties, shape following properties, and stress relaxation properties.

The present inventors intensively studied to realize a breathable sheet excellent in performance balance between flexibility, shape memory properties, shape following properties, and stress relaxation properties. As a result, it was found that a breathable sheet comprised of a 4-methyl-1-pentene-based polymer (a1) or a resin composition (P) containing the 4-methyl-1-pentene-based polymer (a1) as a main component is excellent in air-permeability, flexibility, shape memory properties, shape following properties, and stress relaxation properties, thereby completing the present invention.

Figure 1:
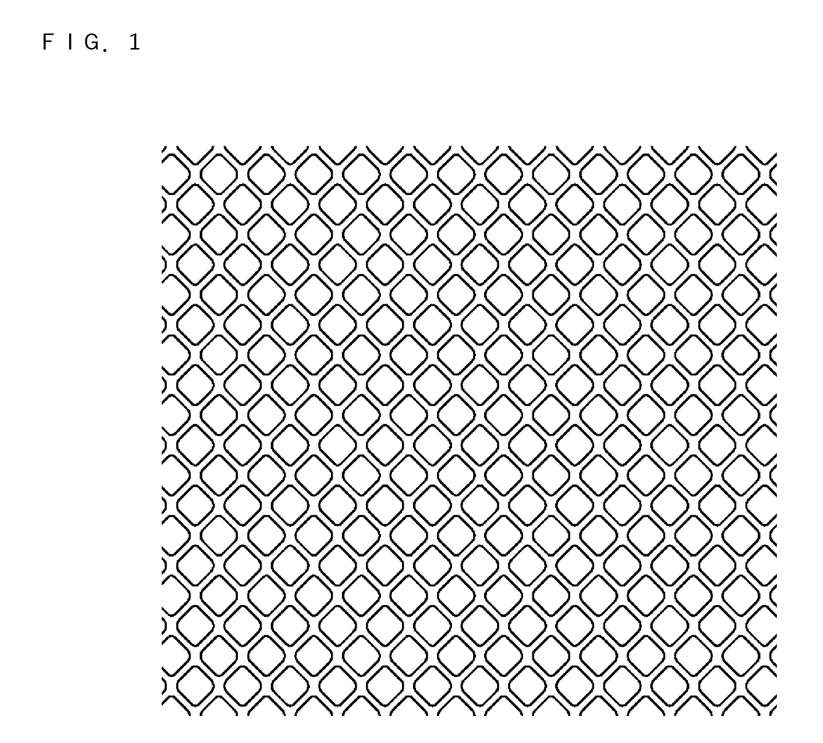
FIG. 1 is a plan view schematically showing an example of a structure of a net-shaped breathable sheet according to an embodiment of the present invention.
Figure 2:
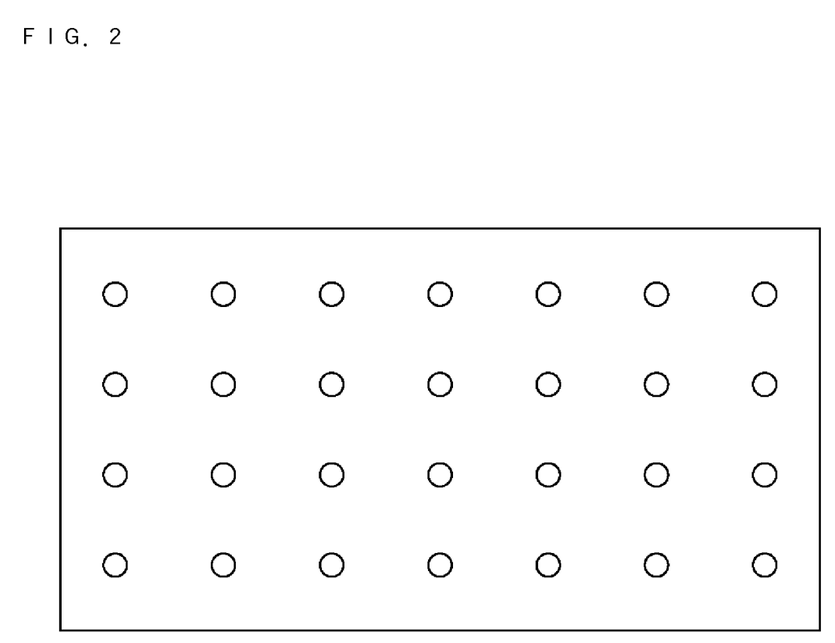
FIG. 2 is a plan view schematically showing an example of a structure of a breathable perforated sheet according to an embodiment of the present invention.

The shape of the breathable sheet (A) according to the present embodiment is not particularly limited, and examples thereof include a net, a mesh, a non-woven fabric, a woven fabric, and a perforated sheet. Among these, from a viewpoint of air-permeability, moldability, ease of production, and the like, one kind selected from a net-shaped breathable sheet (for example, FIG. 1) and a breathable perforated sheet (for example, FIG. 2) is preferable. In addition, the breathable sheet (A) according to the present embodiment may be foamed. That is, the breathable sheet (A) according to the present embodiment may be a foam product or a non-foam product.

The breathable sheet (A) according to the present embodiment is preferably non-crosslinked from a viewpoint of improving shape memory properties, shape following properties, and stress relaxation properties. That is, the breathable sheet (A) according to this embodiment is preferably an uncrosslinked foam that has not been subjected to a crosslinking treatment such as ionizing radiation crosslinking using an electron beam or a γ-ray. With this, it is possible to obtain a breathable sheet (A) which is more excellent in shape memory properties and shape following properties.

In the breathable sheet according to the present embodiment, the air-permeability, which is measured under conditions of 24° C. and 50% RH, in accordance with JIS K6400-7: 2012 (method B), is preferably 1 $cc/cm^2/sec$ or more, more preferably 5 $cc/cm^2/sec$ or more, further more preferably 10 $cc/cm^2/sec$ or more, even further more preferably 20 $cc/cm^2/sec$ or more, and particularly preferably 30 $cc/cm^2/sec$ or more. In a case where the air-permeability is the lower limit or more, it is possible to obtain a breathable sheet (A) more excellent in air-permeability.

In addition, in the breathable sheet according to the present embodiment, an upper limit of the air-permeability, which is measured under the conditions of 24° C. and 50% RH, in accordance with JIS K6400-7: 2012 (method B), is not particularly limited, and is 10,000 cc/cm2/sec or less, for example.

The air-permeability of the breathable sheet (A) according to the present embodiment can be controlled within the range, for example, by appropriately controlling a size of a hole in the breathable sheet (A), a thickness of the breathable sheet (A), an expansion ratio of the breathable sheet (A), and the like.

In the breathable sheet (A) according to the present embodiment, it is preferable that a temperature indicating a maximum value of the loss tangent (tan δ) of dynamic viscoelasticity is preferably at least one or more within a range of 10° C. or more and 100° C. or less, more preferably one or more within a range of 10° C. or more and 80° C. or less, further more preferably one or more within a range of 10° C. or more and 60° C. or less, even further more preferably one or more within a range of 10° C. or more and 50° C. or less, and particularly preferably one within a range of 10° C. or more and 50° C. or less.

In the breathable sheet (A) according to the present embodiment, the maximum value of the loss tangent is preferably 0.5 or more, more preferably 1.0 or more, further more preferably 1.5 or more, and particularly preferably 2.0 or more. In the breathable sheet (A) according to the present embodiment, the maximum value of the loss tangent is preferably 3.5 or less, more preferably 3.2 or less, and further more preferably 3.0 or less.

With this, it is possible to further improve the performance balance between flexibility, shape memory properties, shape following properties, and stress relaxation properties of the breathable sheet (A) according to the present embodiment. Here, the larger the maximum value of the loss tangent, the stronger viscous properties of the breathable sheet (A).

It is not clear why the breathable sheet (A) having strong viscous properties is more excellent in the performance balance between flexibility, shape memory properties, shape following properties, and stress relaxation properties, but the following reasons are considered.

First, the breathable sheet (A) having strong viscous properties can convert more of the mechanical energy given at a time of deformation to heat energy and can absorb more energy. Therefore, it is considered that a restoration speed after deformation becomes more moderate. As a result, it is considered that while maintaining flexibility of the breathable sheet, the shape after deformation can be more favorably maintained, or the deformation can be followed more favorably.

In the present embodiment, for example, by appropriately adjusting (1) the kind or the mixing ratio of the 4-methyl-1-pentene-based polymer (a1) constituting the breathable sheet (A), (2) the presence or absence of crosslinking of the breathable sheet (A), and the like, it is possible to control the maximum value of the loss tangent in a range of 10° C. or more and 100° C. or less within the range.

Among these, for example, increasing the mixing ratio of the 4-methyl-1-pentene-based polymer (a1) in the breathable sheet (A), not subjecting the breathable sheet (A) to a crosslinking treatment, and the like are exemplified as elements for setting the maximum value of the loss tangent in a range of 10° C. or more and 100° C. or less within a desired numerical value range.

Here, the loss tangent (tan δ) obtained by the dynamic viscoelasticity measurement is, for example, cut into a test piece of 30 mm long×15 mm wide, and can be measured using a solid viscoelasticity measurement device under conditions of a chuck-to-chuck distance of 20 mm, a measurement frequency of 10 Hz, a strain amount of 0.1%, a temperature-raising rate of 4° C./min in a tensile mode.

The thickness of the breathable sheet (A) according to the present embodiment is not particularly limited, but is in a range of 0.01 mm or more and 10 mm or less, preferably in a range of 0.02 mm or more and 5 mm or less, and more preferably 0.02 mm or more and 3 mm or less, for example. In a case where the thickness of the breathable sheet (A) according to the present embodiment is within this range, balance between flexibility, shape following properties, stress relaxation properties, lightweight properties, mechanical properties, handleability, appearance, moldability, moisture resistance, and the like becomes more excellent.

The density (weight per unit volume) of the breathable sheet (A) according to the present embodiment is not particularly limited. For example, in a case where the thickness is X mm, the weight per 1 $m^2$ is in a range of 0.05 X kg or more and 1.0 X kg or less, and preferably in a range of 0.1 X kg or more and 0.9 X kg or less. In a case where the weight per 1 $m^2$ of the breathable sheet (A) according to the present embodiment is within this range, the balance between mechanical properties, durability, handleability, moisture resistance, air-permeability, and the like as a material becomes more excellent.

Hereinafter, each component constituting the breathable sheet (A) according to the present embodiment will be described.

4-methyl-1-pentene-based polymer (a1)

The breathable sheet (A) according to the present embodiment contains a 4-methyl-1-pentene-based polymer (a1) as an essential component. With this, the following properties of the breathable sheet (A) according to the present embodiment can be improved.

Examples of the 4-methyl-1-pentene-based polymer (a1) according to the present embodiment include a 4-methyl-1-pentene.α-olefin copolymer (c) including a constitutional unit (c1) derived from 4-methyl-1-pentene and a constitutional unit (c2) derived from α-olefin having 2 to 20 carbon atoms other than 4-methyl-1-pentene.

Here, in the present embodiment, "an α-olefin having 2 to 20 carbon atoms" means not including 4-methyl-1-pentene unless otherwise specified.

In the 4-methyl-1-pentene.α-olefin copolymer (c) according to the present embodiment, from a viewpoint of further improving flexibility of the breathable sheet (A), in a case where a sum of the constitutional unit (c1) and the constitutional unit (c2) is 100 mol %, it is preferable that a content of the constitutional unit (c1) is 10 mol % or more and 90 mol % or less, and a content of the constitutional unit (c2) is 10 mol % or more and 90 mol % or less.

In addition, in the 4-methyl-1-pentene.α-olefin copolymer (c) according to the present embodiment, from a viewpoint of further improving flexibility, mechanical properties, or the like, of the breathable sheet (A), in a case where the sum of the constitutional unit (c1) and the constitutional unit (c2) is 100 mol %, it is more preferable that the content of the constitutional unit (c1) is 30 mol % or more and 90 mol % or less, and the content of the constitutional unit (c2) is 10 mol % or more and 70 mol % or less, it is further more preferable that the content of the constitutional unit (c1) is 50 mol % or more and 90 mol % or less, and the content of the constitutional unit (c2) is 10 mol % or more and 50 mol % or less, it is even further more preferable that the content of the constitutional unit (c1) is 60 mol % or more and 90 mol % or less and the content of the constitutional unit (c2) is 10 mol % or more and 40 mol % or less, and it is particularly preferable that the content of the constitutional unit (c1) is 65 mol % or more and 90 mol % or less and the content of the constitutional unit (c2) is 10 mol % or more and 35 mol % or less.

In the present embodiment, examples of the α-olefin having 2 to 20 carbon atoms used in the 4-methyl-1-pentene.α-olefin copolymer (c) includes a linear or branched α-olefin, a cyclic olefin, an aromatic vinyl compound, a conjugated diene, a functionalized vinyl compound, and the like, and the linear α-olefin is preferable.

The number of carbon atoms of the linear α-olefin is preferably 2 to 10, and more preferably 2 to 3. Examples of the linear α-olefin include ethylene, propylene, 1-butene, 1-pentene, 1-hexene, 1-octene, 1-decene, 1-undecene, 1-dodecene, 1-tetradecene, 1-hexadecene, 1-octadecene, 1-eicosene, and the like. One kind or two or more kinds selected from ethylene, propylene, 1-butene, 1-pentene, 1-hexene, 1-octene, and 1-decene are preferable, and at least one kind selected from ethylene and propylene is more preferable.

The number of carbon atoms of the branched α-olefin is preferably 5 to 20, and more preferably 5 to 15. Examples of the branched α-olefin include 3-methyl-1-butene, 3-methyl-1-pentene, 3-ethyl-1-pentene, 4,4-dimethyl-1-pentene, and 4-methyl-1-hexene, 4,4-dimethyl-1-hexene, 4-ethyl-1-hexene, 3-ethyl-1-hexene, and the like.

The number of carbon atoms of the cyclic olefin is preferably 5 to 15. Examples of the cyclic olefin include cyclopentene, cyclohexene, cycloheptene, norbornene, 5-methyl-2-norbornene, tetracyclododecene, vinyl cyclohexane, and the like.

Examples of the aromatic vinyl compound include mono- or polyalkyl styrene, and the like, such as styrene, α-methyl styrene, o-methyl styrene, m-methyl styrene, p-methyl styrene, o,p-dimethyl styrene, o-ethyl styrene, m-ethyl styrene, and p-methyl styrene.

The number of carbon atoms of the conjugated diene is preferably 4 to 20, and more preferably 4 to 10. Examples of the conjugated diene include 1,3-butadiene, isoprene, chloroprene, 1,3-pentadiene, 2,3-dimethylbutadiene, 4-methyl-1,3-pentadiene, 1,3-hexadiene, 1,3-octadiene, and the like.

Examples of the functionalized vinyl compound include unsaturated carboxylic acids such as a hydroxyl group-containing olefin, a halogenated olefin, a (meth)acrylic acid, a propionic acid, a 3-butenoic acid, a 4-pentenoic acid, a 5-hexenoic acid, a 6-heptenoic acid, a 7-octenoic acid, an 8-nonenoic acid, a 9-decenoic acid, and a 10-undecenoic acid, and anhydrides or acid halides thereof, unsaturated amines such as allylamine, 5-hexenamine, 6-hepteneamine, and the like, (2,7-octadienyl) succinic anhydride, pentapropenyl succinic anhydride, an unsaturated epoxy compound, an ethylenically unsaturated silane compound, and the like.

Examples of the hydroxyl group-containing olefin include a linear or branched terminal hydroxylated α-olefin having 2 to 20 carbon atoms, and preferably 2 to 15 carbon atoms, and the like.

Examples of the halogenated olefin include a linear or branched halogenated α-olefin having 2 to 20 carbon atoms, and preferably 2 to 15 carbon atoms, and the like.

These α-olefins having 2 to 20 carbon atoms can be used alone or in combination of two or more kinds. Among these, ethylene and propylene are preferable, but use of propylene is particularly preferable from a viewpoint of further improving flexibility and the like.

The 4-methyl-1-pentene.α-olefin copolymer (c) may contain constitutional units other than the constitutional unit (c1) and the constitutional unit (c2) within a range of not impairing the object of the present invention. Other constitutions include constitutional units derived from non-conjugated polyene.

Examples of the non-conjugated polyene includes a linear, branched, or cyclic diene having preferably 5 to 20 carbon atoms, and more preferably 5 to 10 carbon atoms, various norbornenes, norbornadienes, and the like. Among these, 5-vinylidene-2-norbornene and 5-ethylidene-2-norbornene are preferable.

From a viewpoint of further improving flexibility or mechanical strength of the breathable sheet (A), the intrinsic viscosity [η] in decalin of 135° C. of the 4-methyl-1-pentene-based polymer according to this embodiment is preferably 0.01 or more and 5.0 dL/g or less, more preferably 0.1 or more and 4.0 dL/g or less, further more preferably 0.5 or more and 3.0 dL/g or less, and particularly preferably 1.0 or more and 2.8 dL/g or less.

The density of the 4-methyl-1-pentene-based polymer according to the present embodiment, measured by ASTM D 1505 (underwater substitution method), is preferably 0.810 or more and 0.850 g/cm$^3$ or less, more preferably 0.820 or more and 0.850 g/cm$^3$ or less, and further more preferably 0.830 or more and 0.850 g/cm$^3$ or less.

The 4-methyl-1-pentene-based polymer according to the present embodiment can be produced by various methods. For example, it is possible to produce the 4-methyl-1-pentene-based polymer according to the present embodiment by using known catalysts such as magnesium-supported titanium catalysts; metallocene catalysts described in WO 01/53369, WO 01/027124, JP-A-H03-193796, JP-A-H02-41303, and the like; olefin polymerization catalysts containing a metallocene compound described in WO 2011/055803, and the like.

Although the content of the 4-methyl-1-pentene-based polymer (a1) in the resin composition (P) according to the present embodiment is not particularly limited, in a case where the entire content of the resin composition (P) is 100% by mass, the content of the 4-methyl-1-pentene-based polymer (a1) is preferably 50% by mass or more, more preferably 60% by mass or more, further more preferably 65% or more by mass, even further more preferably 70% by mass or more, and particularly preferably 75% by mass or more, and preferably 100% by mass or less, more preferably 99.5% by mass or less, further more preferably 99% by mass or less, further more preferably 98% by mass or less, and particularly preferably 97% by mass or less.

With this, it is possible to obtain a breathable sheet (A) which is excellent in balance between flexibility, shape memory properties, shape following properties, stress relaxation properties, lightweight properties, mechanical properties, handleability, appearance, moldability, moisture resistance, and the like.

Expandable Modified Resin (a2)

From a viewpoint of further improving appearance, texture, foaming properties (for example, expansion ratio, cell density), and the like, in a case where the breathable sheet (A) according to the present embodiment is a foam sheet, the resin composition (P) according to the present embodiment may contain an expandable modified resin (a2) (here, the 4-methyl-1-pentene-based polymer (a1) according to the present embodiment is excluded).

The expandable modified resin (a2) according to the present embodiment is not particularly limited as long as foaming properties of the breathable sheet (A) according to the present embodiment are improved, but, for example, at least one kind selected from a thermoplastic resin, a thermoplastic elastomer, and a rubber is preferable.

Examples of the thermoplastic resin (here, the 4-methyl-1-pentene-based polymer (a1) according to the present embodiment is excluded) include thermoplastic polyolefin resins such as low-density polyethylene, medium-density polyethylene, high-density polyethylene, high-pressure low-density polyethylene, polypropylene, poly 1-butene, poly 4-methyl-1-pentene, poly 3-methyl-1-butene, ethylene.α-olefin copolymer, propylene.α-olefin copolymer, 1-butene.α-olefin copolymer, cyclic olefin copolymer, and chlorinated polyolefin; thermoplastic polyamide-based resins such as aliphatic polyamide (nylon 6, nylon 11, nylon 12, nylon 66, nylon 610, nylon 612) and polyether block amide copolymer; thermoplastic polyester-based resins such as polyethylene terephthalate and polybutylene terephthalate; thermoplastic vinyl aromatic resins such as polystyrene, ABS resin, and AS resin; vinyl chloride resins; vinylidene chloride resins; acrylic resins; ethylene-vinyl acetate copolymers; ethylene-methacrylic acid acrylate copolymers; ionomers; ethylene-vinyl alcohol copolymers; polyvinyl alcohols; fluorine-based resins such as polyvinyl fluoride resin, polytetrafluoroethylene, polyvinylidene fluoride, and ETFE; polycarbonate; polyacetal; polyphenylene oxide; polyphenylene sulfide; polyimide; polyarylate; polysulfone; polyether sulfone; rosin-based resins; terpene-based resins; petroleum resins; and the like.

Examples of the rubber include ethylene.α-olefin.diene copolymer rubber, propylene.α-olefin.diene copolymer rubber, 1-butene.α-olefin.diene copolymer rubber, polybutadiene rubber, polyisoprene rubber, neoprene rubber, nitrile rubber, butyl rubber, polyisobutylene rubber, natural rubber, silicone rubber, and the like.

In addition, examples of the thermoplastic elastomer include an olefin-based elastomer, a styrene-based elastomer, an acid-modified styrene-based elastomer, a vinyl chloride-based elastomer, a urethane-based elastomer, an ester-based elastomer, an amide-based elastomer, and the like.

In addition, these expandable modified resins (a2) optionally be modified by acid with acrylic acid, methacrylic acid, maleic acid or the like.

These expandable modified resins (a2) may be used alone or in combination of two or more kinds.

Among these expandable modified resins (a2), one kind or two or more kinds selected from low-density polyethylene, medium-density polyethylene, high-density polyethylene, high-pressure low-density polyethylene, polypropylene, poly 1-butene, poly 4-methyl-1-pentene, poly 3-methyl-1-butene, ethylene.α-olefin copolymer, propylene.α-olefin copolymer, 1-butene.α-olefin copolymer, polyether block amide copolymer, ethylene vinyl acetate copolymer, ethylene.methacrylic acid acrylate copolymer, ionomer, fluorine-based resin, acid-modified fluorine-based resin, rosin-based resin, terpene-based resin and petroleum resin are preferable, and one kind or two or more kinds selected from polyethylene, polypropylene, poly-1-butene, poly-4-methyl-1-pentene, ethylene.α-olefin copolymer, propylene.α-olefin copolymer, 1-butene.α-olefin copolymer, ethylene vinyl acetate copolymer, polyether block amide, ionomer, fluorine-based resin, acid-modified fluorine-based resin, rosin-based resin, terpene-based resin, petroleum resin, and styrene-based elastomer, the addition of which improve melt tension are more preferable.

In addition, those having appropriate compatibility with the 4-methyl-1-pentene-based polymer (a1) according to the present embodiment are more preferable. In addition, among styrene-based elastomers, vinyl SIS (product name: Hybrar, brand 5127) and vinyl SEPS (product name: Hybrar, brand 7125) manufactured by Kuraray Co., Ltd. and SEBS (product name: S.O.E, brand: S1605, S1611, and L609) manufactured by Asahi Kasei Corp. can be preferably used, from a viewpoint of compatibility, a temperature range showing a maximum value of the loss tangent, and a magnitude of the maximum value of the loss tangent.

For the breathable sheet (A) according to the present embodiment, one kind from these expandable modified resins (a2) can be used alone or two or more kinds thereof can be used in combination.

The content of the expandable modified resin (a2) in the breathable sheet (A) according to the present embodiment is not particularly limited, but in a case where the entire content of the breathable sheet (A) is 100% by mass, the content of the expandable modified resin (a2) is preferably 0.5% by mass or more, more preferably 1% by mass or more, furthermore preferably 2% by mass or more, even further more preferably 3% by mass, and preferably 50% by mass or less, more preferably 40% by mass or less, further more preferably 35% by mass or less, even further more preferably 30% by mass or less, and particularly preferably 25% by mass or less.

In a case where the content of the expandable modified resin (a2) is the lower limit or more, it is possible to further improve appearance, texture, foaming properties (for example, expansion ratio, cell density), and the like of the breathable sheet (A) according to the present embodiment. In a case where the content of the expandable modified resin (a2) is the upper limit or less, it is possible to further improve performance balance between flexibility, shape memory properties, shape following properties, and stress relaxation properties of the breathable sheet (A) according to the present embodiment.

Other Components

The resin composition (P) according to the present embodiment may be mixed with additives such as a heat stabilizer, an antioxidant, an ultraviolet absorber, a pigment, an antistatic agent, a copper inhibitor, a flame retardant, a neutralizing agent, a foaming agent, a plasticizer, a nucleating agent, a foam inhibitor, a weather stabilizer, a light stabilizer, an anti-aging agent, a fatty acid metal salt, a softener, a dispersant, a coloring agent, a lubricant, a natural oil, a synthetic oil, a wax, and the like, depending on the necessity.

Among these, in particular, the plasticizer, the softener, the natural oil, and the synthetic oil may be used by controlling the kind and the addition amount in order to adjust a temperature showing a maximum value of the loss tangent (tan δ) of solid viscoelasticity and the maximum value of the loss tangent of the breathable sheet (A) according to the present embodiment.

Production Method of Breathable Sheet (A)

The breathable sheet (A) according to the present embodiment can be obtained by molding a 4-methyl-1-pentene-based polymer (a1) or a resin composition (P) containing the 4-methyl-1-pentene-based polymer (a1) as a main component into a specific shape on the basis of a known method, for example.

The molding apparatus and the molding conditions are not particularly limited, and a known molding apparatus and molding conditions in the related art can be employed. However, it is preferable to perform molding by an extrusion molding apparatus.

Examples of the method for molding the breathable sheet (A) according to the present embodiment include known thermoforming methods such as injection molding, extrusion molding (film/sheet extrusion, profile extrusion, fiber extrusion, strand extrusion, net extrusion, and the like), vacuum molding, blow molding, press molding, pressure molding, calendar molding, bead molding, batch foaming, mold printing, and the like.

The breathable sheet (A) according to the present embodiment is preferably an extruded body.

Method for Preparing Resin Composition (P)

The method for preparing the resin composition (P) according to the present embodiment is not particularly limited, and the resin composition (P) can be prepared, for example, by mixing or melting/kneading each component by a dry blend, a tumbler mixer, a Banbury mixer, a single-screw extruder, a twin-screw extruder, a high-speed twin-screw extruder, a hot roll, and the like.

Molding Method of Breathable Sheet (A)

The breathable sheet (A) according to the present embodiment can be obtained, for example, by molding a 4-methyl-1-pentene-based polymer (a1) or a resin composition (P) containing the 4-methyl-1-pentene-based polymer (a1) as a main component into a desired shape, and depending on the necessity, performing punching processing such as perforating on the basis of a known method.

In addition, in a case where the breathable sheet (A) according to the present embodiment is foamed, a foaming agent can be used at a time of molding. Examples of the foaming agent used at the time of molding include a chemical foaming agent and a physical foaming agent.

Examples of the chemical foaming agent include sodium bicarbonate, ammonium bicarbonate, various carboxylate salts, sodium borohydride, azodicarbonamide, N,N-dinitrosopentamethylenetetramine, P,P-oxybis(benzene sulfonylhydrazide), azobisisobutyronitrile, paratoluene sulfonyl hydrazide, sodium bicarbonate, sodium citrate, and the like.

Examples of the physical foaming agent include carbon dioxide, nitrogen, or a mixture of carbon dioxide and nitrogen, and any of these can be supplied in any of a gaseous, liquid, or supercritical state.

It is preferable that the chemical foaming agent is mixed with the resin composition before being charged into a molding machine and uniformly mixed.

In addition, in a case where carbon dioxide is used as the physical foaming agent, it is preferable that the resin composition comes into a state of being kneaded and plasticized in a molding machine, and is directly injected into the molding machine.

The expansion ratio of the resin composition (P) is not particularly limited, and can be appropriately determined in consideration of all physical properties of the obtained breathable sheet (A).

The method of punching the breathable sheet (A) according to the present embodiment is not particularly limited, and mechanical punching, needle processing, laser perforation, water jet, and the like can be used, for example.

Among the breathable sheets (A) according to the present embodiment, a net-shaped or mesh-shaped form can be molded by a net extrusion method. The net extrusion method is widely used for packaging fruits such as oranges, pears, and apples and packaging vegetables such as potatoes and onions. In the net extrusion method, while a resin composition are extruded from a nozzle of a rotary die for molding a net provided at a tip of an extruder, the resin composition is welded and molded into a net shape, and the obtained extruded net is passed through a water tank at a predetermined temperature. Thereby, a net-shaped or mesh-shaped ventilation sheet is obtained.

Use of Breathable Sheet (A)

The breathable sheet (A) according to the present embodiment can be used, for example, in mobility supplies such as an automobile part, a railway part, an aircraft part, a ship part, and a bicycle part; electronic devices; electrical home appliances; audio devices; camera supplies; precision instruments; game devices; VR devices; civil engineering and construction supplies such as a civil engineering part, a building part, and a building material; household goods such as furniture and bedding; daily necessities such as kitchen utensils, toiletries, and stationery; leisure supplies such as outdoor goods and a backpack; agricultural supplies such as gardening; decoration products such as apparel supplies, shoe supplies, and accessories/portable small goods; medical-related supplies such as medical supplies and healthcare supplies; sports supplies such as sports goods; education/toy supplies such as books and toys; packaging-related supplies such as packaging supplies; cosmetic-related supplies such as facial cleansing and makeup supplies; electric light supplies such as LED lighting; aquaculture supplies such as fishery supplies; safety supplies such as a child seat; music supplies; pet supplies; fishing supplies; and the like.

More specifically, examples of the mobility supplies include a handle, a saddle, a shift lever, a bumper, a seat, a seat belt, a headrest, an armrest, a door trim, an instrument panel, various supporters (a neck supporter, a lumbar supporter), various cushions, a damping material, and the like.

Examples of the electronic devices include a cover of a smartphone, a cover of a personal computer, a watch band, a mouse of a personal computer, a flexible fixing device, a flexible light, and the like.

Examples of the electrical home appliances include a washing machine, a single-lens reflex grip, and the like.

Examples of the audio devices include a damping material, a vibration-proof material, a sound-proof material, a sound insulating material, a speaker, and the like.

Examples of the camera supplies include a camera, a camera grip for broadcasting, and the like.

Examples of the precision instruments include a flexible touch panel, a flexible remote controller, and the like.

Examples of the game devices include a controller and the like.

Examples of the VR devices include a member used for a contact portion between the VR device and an eye, a remote controller for the VR, and the like.

Examples of civil engineering and construction supplies include a damping material, a vibration-proof material, a sound-proof material, a sound insulating material, a sealing material, a cushioning material, and the like.

Examples of the furniture include a chair, a legless chair, a legless chair for lower back pain, an armrest, a cushioning material for cushions and sofas, a gap filling material for parts where load of heavy goods or furniture is applied, supplies for fall prevention measures for earthquakes, and the likes, a sofa, a damping material, a vibration-proof material, and the like.

Examples of the bedding include a chair, a mat, a bed, a futon, a pillow, a cushion, a floor cushion, a hammock, a pillow cover, a cushion material for a pillow, a mattress, a hot-water bottle, and the like. In particular, bedding that can be washed with water is exemplified.

Examples of the kitchen utensils include a cutting board and a grip for cooking utensils such as a kitchen knife, a lunch box, a water bottle, a cup, a dish, a chopstick, a small sake cup, a wine cooler, a wine bag, various cold and warm bags, a drinking mug, a coaster, a pot, a pot stand, cooking utensils for microwave ovens, storage supplies in freezers/refrigerators (a partition plate, a soft closed container having a fitting portion, and the like), a steamer, a tablecloth, a luncheon mat, a mug, and the like.

Examples of the toiletries include a disposable diaper, a toothbrush, a packing, a gasket, a sealant, a warmer, bath supplies used at a time of bathing (in particular, supplies capable of using temperature dependence of storage elastic modulus, that is, supplies capable of using properties of being hard at a low temperature and being soft at a high temperature, and the like), and the like. Examples of such bath supplies used at a time of bathing include a skin material of a glove for body scrubbing, a legless chair, a mat, a roller member of a face roller, acupressure supplies for a three-dimensionally shaped body surface, and the like.

Examples of the stationery include a pen grip, a diary, a front cover of a notebook, a book cover, and the like.

Examples of other daily necessities include a watch band, a thermometer, a cushioning material for fashion dolls, various grips (a pencil, a toothbrush), various covers (a disposable body warmer, a diary, a cover of notebooks, a legless chair for western toilets), a cushioning material of a helmet, a blackout curtain, a smartphone, and the like.

Examples of the outdoor supplies include athletic supplies, nets, a tent, a chair, a folding chair, a tableware, a cutting board, an hammock, and the like.

Examples of the agricultural and gardening supplies include a grafting supporter, a packing, a gasket, a sealant, a bucket, a watering pot, and the like.

Examples of the apparel supplies include clothes, underwear, underclothes (for example, a bra pad, a shoulder pad, corrective underwear, and the like), a hat, a belt, lining of a backpack for school children, a business card holder, glasses, and the like.

Examples of the shoe supplies include various insoles, lining material for shoes, various equipment, shoes, a shoelace, and the like.

The apparel supplies and shoe supplies can be appropriately used since they are unlikely to turn yellow even in a case of being washed, or dried outdoor after washing.

Examples of the accessories and portable small goods include a bracelet, an anklet, a necklace, a misanga, a bracelet, a wallet, a business card holder, various accessory cases, glasses, a core material for bags, a nose cover for glasses, an ear cover for glasses, and the like.

Examples of the medical supplies include various medical base tapes such as a supporter, a cast, a bandage, and a wound tape, stress relieving supplies, tranquilizing supplies, concentration power improving supplies, and an attachment part for artificial hands and prosthetic legs, and the like. For the purpose of further improving the air-permeability, multi-pores connected to the front and the back may be provided by a known punching processing technique such as mechanical punch, needle, and laser perforation.

Examples of the health care supplies/nursing care supplies include a pelvis correction band, a legless chair for low back pain, health equipment, training gym supplies, a spherical hand exerciser for training grip strength, a magnetic necklace, a cushioning material, various supporters (compression supporters including elbows, knees, and hips), a face line belt, a snoring suppression face belt, a waist wrap, a pelvis belt, a necklace, a bracelet, glasses, supplies for preventing senility, a magnet loop, stress relieving goods, a wheelchair (a chair portion, a handle), and the like.

Examples of the sports supplies include sportswear, various tapes for grips (a baseball bat, a tennis racket, a badminton racket, a golf club, and the like), lining member for ski and snowboard shoes, a glove, various protectors (shin guard for soccer, protective gear for martial arts), a club, skis, a snowboard, protectors for various sports, nets for various sports, and the like.

Examples of cultural/educational materials include a picture book, a map, and the like.

Examples of the books include a picture book and the like.

Examples of the toys include a cushioning material of a fashion doll, a stuffed toy, and the like, a mask, and a flexible toy included in a toy of capsule toy vending machine, and the like.

Examples of the packaging supplies include various food packaging materials that can be heat-sealed, a medical packaging material, various industrial packaging materials such as tape, a binding band, and string, a cushioning material, a packaging material, and the like.

Examples of the facial cleansing and make-up supplies include a cosmetic puff, a face pack, a foundation tape, and the like.

Examples of electric light field supplies include LED lighting such as a flexible ride, and the like.

Examples of the fishery supplies include an aquaculture sheet, a blackout curtain, and the like.

Examples of the music supplies include a rubber portion of an earphone and the like.

Examples of the pet supplies include a seat, a collar, a toy, and the like.

Examples of the fishing supplies include a grip of a fishing rod, a fishing glove, a lure, a net, a core material around the net, and the like.

In addition, an adhesive layer may be imparted and used as various adhesive tapes.

Since the breathable sheet (A) according to the present embodiment is excellent in performance balance between flexibility, shape memory properties, shape following properties, and stress relaxation properties, it is possible to reduce a load applied to a human body in a case where the breathable sheet (A) according to the present embodiment is applied to a member which is likely to be directly or indirectly in contact with a human body surface at a time of use. For this reason, the breathable sheet (A) according to the present embodiment can be particularly appropriately used for a member which is likely to be directly or indirectly in contact with a human body surface.

In a case where the breathable sheet (A) according to the present embodiment acts on a human body surface, the breathable sheet (A) according to the present embodiment easily and flexibly follows a three-dimensional shape for a short time. Therefore, it is considered to have an advantage of being excellent in body pressure dispersibility (uniformity of body pressure distribution).

2. Stacked Product

Two or more layers of breathable sheets (A) according to the present embodiment can be stacked and used as a stacked product for various uses described above, for example.

Two or more sheets of the same breathable sheet (A) can be stacked, and two or more sheets of the breathable sheet (A) having different forms can be stacked. At a time of stacking, the breathable sheets can be bonded together with an adhesive or the like, or may not be bonded. In addition, single sheets can be stacked, and long sheets can be folded and stacked.

3. Complex

The breathable sheet (A) according to the present embodiment or the stacked product according to the present embodiment can be used as a composite (C) for various uses by being combined with a member (B) that is different from the breathable sheet (A).

That is, the composite (C) according to the present embodiment includes the breathable sheet (A) and a member (B) which is provided on at least one surface of the breathable sheet (A) and is different from the breathable sheet (A).

The breathable sheet (A) according to the present embodiment is excellent in the performance balance between flexibility and shape following properties, and therefore is excellent in adhesiveness to the member (B) that is different from the breathable sheet (A). For this reason, the composite (C) according to the present embodiment can maintain the adhesiveness between the breathable sheet (A) and the member (B) even in a case of being used for a long time, and is excellent in durability. That is, the composite (C) according to the present embodiment is excellent in the performance balance between flexibility, shape memory properties, stress relaxation properties, and durability.

As a method of forming the composite (C) according to the present embodiment, various known methods are applicable.

For example, it is possible to prepare the composite (C) by stacked the member (B) on the breathable sheet (A) and, depending on the necessity, heating and pressing with a press and the like, or performing welding.

In addition, it is also possible to prepare the composite (C) by imparting an adhesive between the breathable sheet (A) and the member (B), and subsequently bonding the breathable sheet (A) and the member (B) via an adhesive.

As the adhesive, it is possible to appropriately use an SBR-based solvent adhesive or a hot melt adhesive comprised of EVA, a petroleum resin, a mixture of EVA and a petroleum resin, and the like.

The member (B) that is different from the breathable sheet (A) is not particularly limited, but examples thereof include a woven fabric, a non-woven fabric, a synthetic fiber, an artificial leather, a synthetic leather, a natural leather, fur, metal, a carbon material, a rubber, a thermoplastic elastomer, a thermoplastic resin, a thermosetting resin, a polymer foam, a mesh structure (warp knitted fiber, Double Russell Mesh, 3D spring structure, and the like), a fiber reinforced plastic, a paper, wood, glass, stone, ceramic, and the like. These members may be used alone or in combination of two or more kinds. The composite (C) according to this embodiment may be a stacked product obtained by bonding a suede-like artificial leather (product name: Ultra Suede) manufactured by Toray Industries, Inc. as an artificial leather to a breathable sheet (A); a stacked product obtained by bonding various base fabrics (PVC, polyester, polyurethane, split fiber fabric, and the like) to a breathable sheet (A); and a stacked product obtained by a urethane foam as a polymer foam (containing low impact resilience urethane foam and film-removing urethane foam) being bonded to or physically stacked with the breathable sheet (A).

In addition, it is preferable that the member (B) also has air-permeability. A ventilation amount of the member (B), which is measured under conditions of 24° C. and 50% RH, in accordance with JIS K6400-7: 2012 (method B), is not particularly limited, and the ventilation amount is, for example, preferably 1 cc/cm$^2$/sec or more, more preferably 5 cc/cm$^2$/sec or more, further more preferably 10 cc/cm$^2$/sec or more, even further more preferably 20 cc/cm$^2$/sec or more, and particularly preferably 30 cc/cm$^2$/sec. In a case where the ventilation amount is the lower limit or more, it is possible to obtain a composite more excellent in air-permeability.

In addition, the upper limit of the ventilation amount of the member (B), which is measured under the conditions of 24° C. and 50% RH, in accordance with JIS K6400-7: 2012 (method B), is not particularly limited, but is 10,000 cc/cm$^2$/sec or less, for example.

Although the embodiment of the present invention has been described above, this is merely an example of the present invention, and various configurations other than the above can be adopted.

In addition, the present invention is not limited to the above-described embodiment, and includes modifications and improvements within a range capable of achieving the object of the present invention.

EXAMPLES

Hereinafter, the present invention will be specifically described on the basis of examples, but the present invention is not limited to these examples.

1. Measuring Method

(1) Ventilation Amount of Breathable Sheet

The measurement was performed under conditions of 24° C. and 50% RH, in accordance with JIS K6400-7: 2012 (method B).

(2) Dynamic Viscoelasticity

The breathable sheet was cut into a strip shape to obtain a test piece. Subsequently, using a solid viscoelasticity measuring device (RSAIII manufactured by TA Instruments), temperature dependence of dynamic viscoelasticity in a temperature range of 0° C. to 60° C. was measured under conditions of a sample width of 15 mm, a chuck-to-chuck distance of 20 mm, a measurement frequency of 10 Hz, a strain amount of 0.1%, a heating rate of 4° C./min, and a tensile mode. From the obtained graph, a temperature indicating a maximum value of the loss tangent (tan δ) and the maximum value of the tan δ were obtained.

(3) Skin Moisture Content and Increase Amount of Skin Moisture Content

The breathable sheet was cut into 3 cm×3 cm to obtain a test piece. Subsequently, the test piece was attached to a forearm, and the moisture content of skin before and after the attachment (a time for attaching the test piece to the forearm was 2 hours) was measured with a skin hygrometer (SR-101 manufactured by Lozenstar Co., Ltd.).

It was evaluated that the higher the increase amount of the skin moisture content, the greater the stuffiness.

(4) Clothing Pressure and Clothing Pressure Relaxation Rate

The breathable sheet was cut into 18 cm×5 cm to obtain a test piece. Using a clothing pressure measuring device (model number AMI3037-10 manufactured by AMI Techno Co., Ltd.), the test piece was wound around a mannequin forearm so as to sandwich a sensor unit of the device, and then a predetermined amount of air was injected into the sensor unit to measure a time change of a pressure held immediately after the injection. The pressure immediately after the air injection into the sensor unit (0 second) and the pressure after 60 seconds were defined as $P_0$ and $P_1$, respectively.

The measurement conditions are as follows.

Room temperature during measurement: 25° C.

Relative humidity at a time of measurement: 48%

Sample size: 18 cm×5 cm

Chuck portion: 1 cm

Circumference of winding portion: 25 cm

Used sensor: Circular shape (diameter 2 cm)

Air injection amount: about 0.15 mL

Measurement time: 1 minute

The clothing pressure relaxation rate was determined by the following equation.

$$\text{Clothing pressure relaxation rate } [\%] = (P_0 - P_1)/P_0 \times 100$$

As the clothing pressure relaxation rate became higher, the better performance balance between flexibility, shape memory properties, shape following properties, and stress relaxation properties was indicated, and it was regarded as being excellent in that stretch is generated and feeling of tension generated when a joint is bent is lowered in a region of a body surface where the breathable sheet is wound or attached.

(5) Intrinsic Viscosity [η] of 4-methyl-1-pentene-based polymer

The intrinsic viscosity [η] was measured at 135° C. using a decalin solvent.

(6) Composition of 4-methyl-1-pentene-based polymer

The contents of 4-methyl-1-pentene and α-olefin in the 4-methyl-1-pentene-based polymer were determined by $^{13}$C-NMR.

(7) Density of 4-methyl-1-pentene-based polymer

It was calculated from the weight of each sample measured in water and air using an electronic hydrometer MD-300S manufactured by ALFA MIRAGE Co., Ltd. in accordance with ASTM D 1505 (underwater substitution method).

2. Raw Material

Raw materials used in Examples and Comparative Examples are shown below.

(1) 4-methyl-1-pentene-based polymer (a1)

4-methyl-1-pentene-based polymer 1: copolymer of 4-methyl-1-pentene and propylene (content of constitutional unit derived from 4-methyl-1-pentene: 72 mol %, content of constitutional unit derived from propylene: 28 mol %, intrinsic density in decalin at 135° C. [η]: 1.5 dL/g, density measured in accordance with ASTM D 1505 (underwater substitution method): 0.84 g/cm$^3$)

(2) Styrene-Based Elastomer

Material: SEBS, density: 0.90 g/cm$^3$, brand: Clayton G1657MS manufactured by Kraton Polymer Japan Corporation Example 1

As a molding machine, an apparatus composed of a single screw extruder, a T-die, a cooling roll, and a take-off device was used. The 4-methyl-1-pentene-based polymer 1 was melted and kneaded in a cylinder of the single screw extruder, and extruded from the T-die into a sheet shape. The extruded sheet was cooled with the cooling roll while continuously performing bonding onto a silicone-coated surface of a silicone-coated PET release sheet (thickness 0.1 mm), and the take-off device was used to take off the sheet together with the silicone-coated PET release sheet.

The obtained sheet comprised of 4-methyl-1-pentene-based polymer 1 with a silicone-coated PET release sheet was subjected to a perforation processing one time using an A pattern manufactured by Tech-inter Corporation shown in Table 3. Specifically, the sheet comprised of the 4-methyl-1-pentene-based polymer 1 with the silicone-coated PET release sheet was passed between a needle roll of A pattern shown in Table 3 and a pressing roll, thereby performing perforation processing of the sheet.

A silicone-coated PET release sheet layer was peeled off from the sheet obtained by the perforation processing to obtain a single-layer sheet comprised of perforated 4-methyl-1-pentene-based polymer 1. Each evaluation was performed on the obtained sheet. Table 1 shows the obtained results.

Examples 2 to 16 and Comparative Examples 1 to 4 and 6

Except that the kind of pattern used in perforation processing and the kind of the polymer used were changed to each of those shown in Tables 1 to 3, and the number of perforation processing and a sheet thickness were changed to each of the values shown in Tables 1 and 2, sheets were prepared in the same manner as in Example 1.

Each evaluation was performed on the obtained sheet. The obtained results are shown in Tables 1 and 2, respectively.

Example 18

As the molding machine, an apparatus composed of a single screw extruder, a T-die, a cooling roll, a carbon dioxide supply device, and a take-off device was used. While melting and kneading the 4-methyl-1-pentene-based polymer 1 in a cylinder of the single screw extruder, carbon dioxide was injected from the carbon dioxide supply device in the cylinder of the extruder, and the 4-methyl-1-pentene-based polymer 1 was extruded from the T-die into a sheet shape. An extruded foam sheet was cooled by the cooling roll, and was taken off by using the take-off device.

The obtained foam sheet was subjected to perforation processing one time using a B pattern manufactured by Tech-inter Corporation shown in Table 3. Specifically, the foam sheet was perforated by passing the foam sheet between a needle roll having a B pattern shown in Table 3 and a pressing roll. Each evaluation was performed on the obtained foam sheet. The obtained results are shown in Table 2.

Examples 17 and 19 to 20 and Comparative Example 5

Except that the kind of pattern used in perforation processing was changed to each of those shown in Tables 2 and 3, and the number of perforation processing and a sheet thickness were changed to each of the values shown in Table 2, foam sheets were prepared in the same manner as in Example 18.

Each evaluation was performed on the obtained foam sheet. The obtained results are shown in Table 2.

Example 21

As a molding machine, an apparatus composed of a single-screw extruder, a rotary die for net molding, a water tank, and a take-off device was used. The 4-methyl-1-pentene-based polymer 1 was melted and kneaded in a cylinder of the single screw extruder, and extruded from a net-molding rotary die into a net shape. The extruded net was cooled in the water tank, and was taken off by using the take-off device to prepare a net-shaped breathable sheet having a fiber diameter (diameter) of 1 mm and an intersection point distance of 1 cm.

TABLE 1

| | | Non-foam sheet | | | | | | |
|---|---|---|---|---|---|---|---|---|
| | | Comparative Example 1 | Example 1 | Example 2 | Example 3 | Example 4 | Comparative Example 2 | Example 5 |
| Kind of polymer | | 4-methyl-1-pentene polymer 1 | | | | | | |
| Kind of pattern used in perforation processing | | — | A | A | A | A | — | A |
| Number of times of perforation processing | [Number of times] | 0 | 1 | 2 | 3 | 4 | 0 | 1 |
| Loss tangent (tan δ) | Maximum value | 2.5 | 2.5 | 2.5 | 2.6 | 2.6 | 2.6 | 2.6 |
| | Temperature indicating maximum value [° C.] | 32 | 33 | 34 | 34 | 35 | 34 | 35 |
| Thickness | [mm] | 0.036 | 0.036 | 0.036 | 0.036 | 0.036 | 0.048 | 0.048 |
| Ventilation amount | [cc/cm$^2$/s] | 0 | 8 | 24 | 35 | 45 | 0 | 13 |
| Skin moisture content [%] | Before attachment (X) | 35.0 | 34.0 | 36.2 | 36.9 | 38.4 | 37.8 | 39.2 |
| | After attachment (Y) | 48.2 | 39.3 | 40.6 | 38.4 | 39.9 | 48.3 | 46.1 |
| Increase amount [%] | (Z = Y − X) | 13.2 | 5.3 | 4.4 | 1.5 | 1.5 | 10.5 | 6.8 |
| Clothing pressure [kPa] | After 0 second ($P_0$) | 4.2 | 4.2 | 4.3 | 4.3 | 4.4 | 4.3 | 4.3 |
| | After 60 seconds ($P_1$) | 0.5 | 0.5 | 0.5 | 0.5 | 0.5 | 0.6 | 0.6 |
| Clothing pressure relaxation rate [%] | ($P_0 − P_1$)/ $P_0$ × 100 | 88 | 88 | 88 | 88 | 89 | 86 | 86 |

| | | Non-foam sheet | | | |
|---|---|---|---|---|---|
| | | Example 6 | Example 7 | Example 8 | Example 9 |
| Kind of polymer | | 4-methyl-1-pentene polymer 1 | | | |
| Kind of pattern used in perforation processing | | A | A | A | A |
| Number of times of perforation processing | [Number of times] | 2 | 3 | 4 | 5 |
| Loss tangent (tan δ) | Maximum value | 2.6 | 2.5 | 2.5 | 2.5 |
| | Temperature indicating maximum value [° C.] | 34 | 33 | 33 | 35 |
| Thickness | [mm] | 0.048 | 0.048 | 0.048 | 0.048 |
| Ventilation amount | [cc/cm$^2$/s] | 18 | 23 | 28 | 37 |
| Skin moisture content [%] | Before attachment (X) | 38.7 | 37.4 | 36.8 | 36.5 |
| | After attachment (Y) | 42.7 | 39.1 | 38.8 | 38.5 |
| Increase amount [%] | (Z = Y − X) | 4.0 | 1.7 | 1.9 | 2.0 |
| Clothing pressure [kPa] | After 0 second ($P_0$) | 4.3 | 4.3 | 4.3 | 4.3 |
| | After 60 seconds ($P_1$) | 0.6 | 0.6 | 0.6 | 0.6 |
| Clothing pressure relaxation rate [%] | ($P_0 − P_1$)/ $P_0$ × 100 | 86 | 86 | 86 | 86 |

TABLE 2

| | | Non-foam sheet | | | | | | | | |
|---|---|---|---|---|---|---|---|---|---|---|
| | | Comparative Example 3 | Example 10 | Example 11 | Example 12 | Example 13 | Example 14 | Comparative Example 4 | Example 15 | Example 16 |
| Kind of polymer | | 4-methyl-1-pentene polymer 1 | | | | | | | | |
| Kind of pattern used in perforation processing | | — | A | A | A | A | A | — | B | C |
| Number of times of perforation processing | [Number of times] | 0 | 1 | 2 | 3 | 4 | 5 | 0 | 1 | 1 |
| Loss tangent (tan δ) | Maximum value | 2.5 | 2.5 | 2.6 | 2.5 | 2.5 | 2.4 | 2.6 | 2.6 | 2.6 |
| | Temperature indicating maximum value [° C.] | 35 | 33 | 33 | 33 | 35 | 34 | 35 | 33 | 35 |
| Thickness | [mm] | 0.075 | 0.075 | 0.075 | 0.075 | 0.075 | 0.075 | 0.10 | 0.10 | 0.10 |
| Ventilation amount | [cc/cm$^2$/s] | 0 | 5 | 16 | 26 | 35 | 48 | 0 | 9 | 22 |
| Skin moisture content [%] | Before attachment (X) | 33.1 | 34.0 | 36.6 | 35.5 | 34.4 | 32.0 | 32.5 | 33.6 | 35.4 |
| | After attachment (Y) | 45.6 | 38.9 | 44.1 | 38.5 | 37.0 | 34.3 | 47.7 | 37.2 | 35.0 |
| Increase amount [%] | (Z = Y − X) | 12.5 | 4.9 | 7.5 | 3.0 | 2.6 | 2.2 | 15.2 | 3.6 | −0.4 |
| Clothing pressure [kPa] | After 0 second ($P_0$) | 4.3 | 4.3 | 4.3 | 4.4 | 4.3 | 4.5 | 4.1 | 4.3 | 4.6 |
| | After 60 seconds ($P_1$) | 0.8 | 0.8 | 0.8 | 0.8 | 0.8 | 0.9 | 0.8 | 0.8 | 0.9 |
| Clothing pressure relaxation rate [%] | ($P_0 − P_1$)/$P_0$ × 100 | 81 | 81 | 81 | 82 | 81 | 80 | 81 | 81 | 80 |

| | | Foam sheet | | | | | Net-shaped sheet | Non-foam sheet |
|---|---|---|---|---|---|---|---|---|
| | | Example 17 | Example 18 | Example 19 | Comparative Example 5 | Example 20 | Example 21 | Comparative Example 6 |
| Kind of polymer | | 4-methyl-1-pentene polymer 1 | | | | | | SEBS |
| Kind of pattern used in perforation processing | | — | B | C | — | C | — | — |
| Number of times of perforation processing | [Number of times] | 0 | 1 | 1 | 0 | 1 | 0 | 0 |
| Loss tangent (tan δ) | Maximum value | 2.6 | 2.6 | 2.6 | 2.6 | 2.6 | 2.4 | Not measured |
| | Temperature indicating maximum value [° C.] | 28 | 28 | 28 | 28 | 28 | 32 | Not measured |
| Thickness | [mm] | 0.50 | 0.50 | 0.50 | 1.1 | 1.1 | 0.9 | 0.10 |
| Ventilation amount | [cc/cm$^2$/s] | 2 | 10 | 10 | 0 | 2 | 400 or more | 0 |
| Skin moisture content [%] | Before attachment (X) | 35.9 | 34.7 | 33.6 | 36.0 | 36.6 | 33.4 | 36.0 |
| | After attachment (Y) | 37.9 | 45.8 | 39.8 | 46.6 | 46.5 | 35.9 | 46.0 |
| Increase amount [%] | (Z = Y − X) | 2.0 | 11.0 | 6.2 | 10.6 | 9.9 | 2.4 | 10.0 |
| Clothing pressure [kPa] | After 0 second ($P_0$) | 4.3 | 4.8 | 5.0 | 6.0 | 6.1 | 4.0 | 4.7 |
| | After 60 seconds ($P_1$) | 1.0 | 1.1 | 1.2 | 2.4 | 2.4 | 0.8 | 2.4 |
| Clothing pressure relaxation rate [%] | ($P_0 − P_1$)/$P_0$ × 100 | 77 | 77 | 77 | 60 | 60 | 80 | 50 |

TABLE 3

| Pattern | | Name Brand name | A (113) | B (106) | C (107B) |
|---|---|---|---|---|---|
| Needle diameter | [mm] | | φ1.065 | φ 1.22 | φ 1.50 |
| Pore interval (length × breadth) | [mm] | | 2.50 × 2.50 | 6.35 × 6.35 | 16.00 × 8.00 |
| Number of perforations | [/m²] | | 320000 | 496000 | 15625 |
| Theoretical open porosity | [%] | | About 16.0 | About 4.0 | About 1.8 |

Example 22

An inner sole was prepared by punching out a foam sheet of Example 20 into a foot shape.

Subsequently, a leather shoe with the inner sole was used for one day (about 12 hours), and a sense of fit, a sense of grip, stuffiness and a sense of fatigue were evaluated on the following five scales. The obtained results are shown in Table 4.

5: Pretty good, 4: good, 3: cannot say either way, 2: bad, 1: pretty bad

Comparative Example 7

Except that the foam sheet of Comparative Example 5 was used, an inner sole was prepared in the same manner as in Example 22, and the same evaluation was performed. The obtained results are shown in Table 4.

TABLE 4

| Evaluation item | Sense of fit | Sense of grip | Stuffiness | Sense of fatigue |
|---|---|---|---|---|
| Example 22 | 5 | 5 | 4 | 5 |
| Comparative Example 7 | 5 | 5 | 1 | 3 |

Example 23

The sheet obtained in Example 1 was cut into a size of 3 cm in width×15 cm in length. Subsequently, the left forefinger was wrapped around the finger from the fingertip to the second joint, desk-worked for about 3 hours, and the sense of fit, discomfort, stuffiness, and low stretchiness were evaluated on the following five scales. The obtained results are shown in Table 5.

5: Pretty good, 4: good, 3: cannot say either way, 2: bad, 1: pretty bad

Comparative Example 8

Except that the sheet obtained in Comparative Example 6 was used, the same evaluation as in Example 23 was performed. The obtained results are shown in Table 5.

TABLE 5

| Evaluation item | Sense of fit | Discomfort | Stuffiness | Low stretchiness |
|---|---|---|---|---|
| Example 23 | 5 | 5 | 4 | 5 |
| Comparative Example 8 | 5 | 5 | 2 | 2 |

Example 24

The net-shaped breathable sheet obtained in Example 21 was cut into a 30 cm square. 30 samples were prepared. Subsequently, the obtained 30 breathable sheets were stacked and fixed so as not to shift to form a cushion sheet. The obtained cushion sheet was placed on a car seat (driver's seat) and continuously drove for about 3 hours, and the sense of fit, sitting comfort and the sense of fatigue were evaluated on the following five scales. The obtained results are shown in Table 6.

5: Pretty good, 4: good, 3: cannot say either way, 2: bad, 1: pretty bad

Comparative Example 9

Except that a net-shaped sheet made of polyethylene was used, a cushion sheet was prepared in the same manner as in Example 24. Subsequently, the same evaluation as in Example 24 was performed. The obtained results are shown in Table 6.

TABLE 6

| Evaluation item | Sense of fit | Sitting comfort | Sense of fatigue |
|---|---|---|---|
| Example 24 | 5 | 5 | 5 |
| Comparative Example 9 | 1 | 1 | 2 |

This application claims priority based on Japanese Patent Application No. 2018-045280 filed on Mar. 13, 2018, the entire disclosure of which is incorporated herein.

The invention claimed is:

1. A breathable sheet comprised of a 4-methyl-1-pentene-based polymer or a resin composition containing the 4-methyl-1-pentene-based polymer as a main component,
   wherein the 4-methyl-1-pentene-based polymer contains a constitutional unit derived from 4-methyl-1-pentene and a constitutional unit derived from an α-olefin having 2 to 3 carbon atoms,
   wherein at least one or more temperatures at which a maximum value of a loss tangent (tan δ) is exhibited, which is obtained by a dynamic viscoelasticity measurement, are present in a range of 10° C. or more and 100° C. or less, and the maximum value of the loss tangent is 0.5 or more and 3.5 or less, and
   wherein the breathable sheet has an air-permeability of 5 cc/cm²/sec or more, which is measured under conditions of 24° C. and 50% RH, in accordance with JIS K6400-7: 2012 (method B).

2. The breathable sheet according to claim 1, wherein the breathable sheet is selected from the group consisting of a net, a mesh, a non-woven fabric, a woven fabric, and a perforated sheet.

3. The breathable sheet according to claim 1, wherein the breathable sheet has a thickness in a range of 0.01 mm or more and 10 mm or less.

4. The breathable sheet according to claim 1,
wherein the breathable sheet is used for a member that may be directly or indirectly in contact with a human body surface when used.

5. The breathable sheet according to claim 1,
wherein the breathable sheet is a non-foam product.

6. A stacked product formed by stacked two or more layers of the breathable sheet according to claim 1.

7. A composite comprising:
the breathable sheet according to claim 1; and
a member that is different from the breathable sheet and is provided on at least one surface of the breathable sheet.

8. The composite according to claim 7,
wherein the member that is different from the breathable sheet contains one kind or two or more kinds selected from the group consisting of a woven fabric, a non-woven fabric, a synthetic fiber, an artificial leather, a synthetic leather, a natural leather, a fur, a metal, a carbon material, a rubber, a thermoplastic elastomer, a thermoplastic resin, a thermosetting resin, a polymer foam, a mesh structure, a fiber-reinforced plastic, a paper, an wood, a glass, a stone, and a ceramic.

9. The composite according to claim 7,
wherein the member that is different from the breathable sheet has an air-permeability of 1 cc/cm$^2$/sec or more, which is measured under the conditions of 24° C. and 50% RH, in accordance with JIS K6400-7: 2012 (method B).

10. The breathable sheet according to claim 1,
wherein a sum of the constitutional unit derived from 4-methyl-1-pentene (c1) and the constitutional unit derived from the α-olefin having 2 to 3 carbon atoms (c2) is 100 mol %, a content of the constitutional unit (c1) is 10 mol % or more and 90 mol % or less and a content of the constitutional unit (c2) is 10 mol % or more and 90 mol % or less.

11. The breathable sheet according to claim 1,
wherein an entire content of the resin composition is 100% by mass, a content of the 4-methyl-1-pentene-based polymer is 50% by mass or more.

12. The breathable sheet according to claim 1,
wherein the breathable sheet is non-crosslinked.

* * * * *